United States Patent [19]

Goodrich

[11] 4,227,775
[45] Oct. 14, 1980

[54] COLLOIDAL LIGHT VALVE HAVING ENHANCED IMAGE CONTRAST

[75] Inventor: George W. Goodrich, Bloomfield Hills, Mich.

[73] Assignee: The Bendix Corporation, Southfield, Mich.

[21] Appl. No.: 972,138

[22] Filed: Dec. 21, 1978

[51] Int. Cl.$^2$ ............................................. G02F 1/17
[52] U.S. Cl. ...................... 350/267; 350/362; 350/339 D
[58] Field of Search .................. 350/267, 362, 355

[56] References Cited

U.S. PATENT DOCUMENTS

| | | | |
|---|---|---|---|
| 3,897,137 | 7/1975 | Dobbins | 350/267 X |
| 3,960,438 | 6/1976 | Bonne et al. | 350/347 X |

Primary Examiner—John K. Corbin
Assistant Examiner—Matthew W. Koren
Attorney, Agent, or Firm—James R. Ignatowski; Russel C. Wells

[57] ABSTRACT

A colloidal light valve having enhanced image contrast is disclosed. The colloidal light valve has a diffusely transmissive front window and a specially reflective surface on the rear substrate. A thin colloidal suspension of dichroic particles disposed between the window and the rear substrate is operative to change its optical density in the presence of an electrostatic field. In the preferred embodiment, transparent electrodes are disposed on the inner surface of the front window permitting an electrostatic field to be applied across the colloidal suspension in the regions immediately underlying the electrodes. The electrodes are arranged in the familiar multi-element bar pattern capable of forming alpha numerical characters.

8 Claims, 5 Drawing Figures

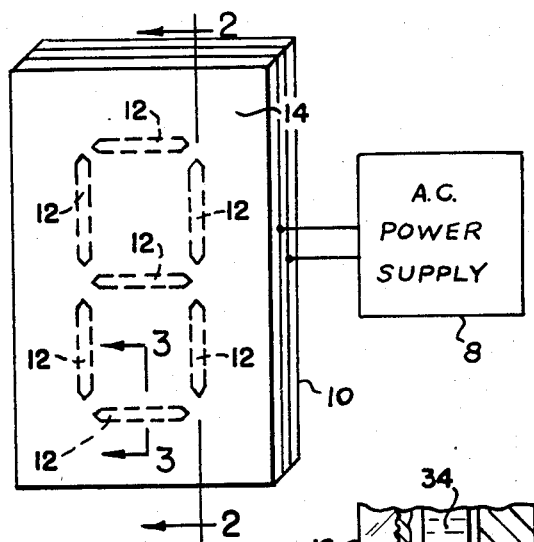
FIG. 1
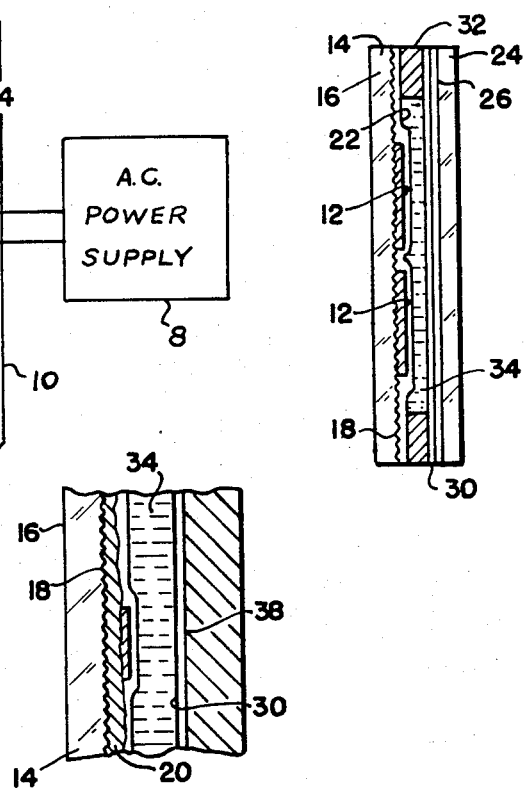
FIG. 2
FIG. 3
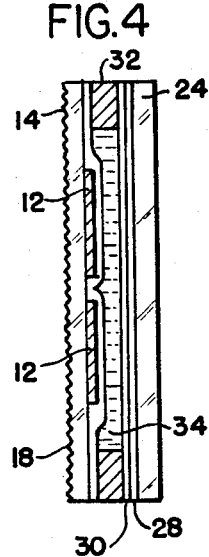
FIG. 4
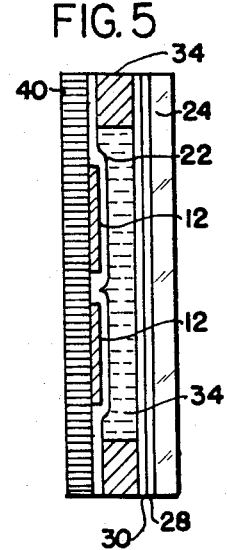
FIG. 5

COLLOIDAL LIGHT VALVE HAVING ENHANCED IMAGE CONTRAST

BACKGROUND OF THE INVENTION

1. Field of the Invention

The invention is related to the field of visual displays and in particular to the field of colloidal light valve displays.

2. Prior Art

Visual displays based on the colloidal light valve principal are generally well known in the art. Colloidal light valves as first taught by Land in U.S. Pat. Nos. 1,955,923, issued Apr. 23, 1934 and 1,963,496, issued June 19, 1934, embody dichroic dipole particles suspended in a colloid of fluid medium in which the randomly oriented dichroic dipole particles can be caused to align under the influence of an electrostatic or magnetic fields. The suspended dipole particles may be dehydrated or dyed causing the randomly oriented colloid suspension to be opaque to incident light. For display purposes, it is generally preferred to treat the particles so that in the randomly oriented state, the particles absorb the incident light producing what is generally referred to as a dark field. When an electric field is impressed across the colloidal suspension, the particles align and the suspension becomes transparent.

The prior passive display art using colloidal valves teaches the use of specular or diffuse reflectors behind the colloidal suspension of dichroic particles to reflect the incident or ambient light passed through the activated and therefore transparent portion of the display. Specular reflective surfaces are undesirable in that the transmitted light is specularly reflected and observation of the reflected image is position sensitive with respect to the direction of the incident light. Further reflected images surrounding the observer are superimposed on the displayed image which detracts from the quality of the image. Diffuse reflectors have the disadvantage that only a smaller portion of the incident light re-emerges from the entrance window to produce the passive image. This is due to the polarizing effect of the aligned particles which permit only about one-half of the obliquely incident light to be transmitted to the diffuse reflector and only about one-half of the diffusely reflected light to be transmitted back and emerge from the front window. The brightness of the resulting image with diffuse reflectors is therefore not as bright as with a specular reflector especially when the viewing angle lies close to the angle of reflection of the light source.

Dobbins in U.S. Pat. No. 3,897,137, issued July 29, 1975, teaches one the solution of this problem. In his patent, Dobbins discloses a display in which a liquid crystal and a colloidal light valve are placed in tandem, i.e., one behind the other. When activated, the transmissive portion of the liquid crystal valve is turbid (translucent), therefore, the light transmitted through the liquid crystal cell and received by the colloidal valve is diffused. The colloidal valve has a specular reflective surface behind the colloidal suspension and therefore one-half of the received light emerges back out the entrance window. The light emerging from the colloidal light valve is again diffusely transmitted by the liquid crystal valve producing a diffuse image having a higher contrast than a colloidal display having only a diffuse reflective surface. The disclosed tandem liquid crystal cell and colloidal valve eliminates the problems discussed with respect to colloidal displays having only a specular reflective surface.

Disclosed herein is a colloidal display having a high contrast diffuse image comparable to that disclosed by Dobbins without requiring an additional liquid crystal display.

SUMMARY OF THE INVENTION

The invention is a colloidal display having enhanced image contrast. The display comprises a thin colloidal suspension of dichroic dipole particles disposed between a diffusely transmissive front window and a rear substrate. A set of electrically conductive transparent electrodes are deposited in the inner surface of the front window in a predetermined pattern. The rear substrate has a specularly reflective inner surface which may be a polished surface of a metallic substrate or a metallic film deposited on a non-metallic substrate. An AC electrical potential applied between specularly reflective surface and the transparent electrodes causes the colloidal suspension immediately underlying the electrodes to become transparent. Light incident on the front window is diffusely transmitted through the diffusely transmissive window through the transparent portion of the colloidal suspension and specularly reflected at the inner suface of the rear substrate. The specularly reflected light is transmitted back through the transparent portion of the colloidal suspension and diffusely transmitted by the front window producing an image corresponding to the image of the activated transparent electrodes.

The object of the invention is a colloidal display having high image brightness. Another object of the invention is a colloidal display having a specularly reflective rear electrode and a diffusely transmissive front window. Another object of the invention is a colloidal display free from first surface specular reflection of the surroundings. Another object of the invention is a colloidal display having a specularly reflective rear electrode and a transparent front or entrance window having a diffusely transmissive internal surface. Still another object of the invention is a colloidal display having a specular reflective rear electrode and a transparent front window having diffusely transmissive external surface. A final object of the invention is a colloidal display having a reflective rear electrode and the front window is a fiber optic plate.

These and other objects of the invention will become apparent from a reading of the specification in conjunction with the drawing.

BRIEF DESCRIPTION OF THE FIGURES

FIG. 1 is a front view of the disclosed colloidal display.

FIG. 2 is a cross-section of the colloidal display shown in FIG. 1 in the direction of arrows 2—2.

FIG. 3 is an enlarged cross-section of the colloidal display shown in FIG. 1 in the direction of the arrows 3—3.

FIG. 4 is a cross-sectional view of an alternate embodiment of the colloid display in which the front surface of the window is diffusely transmissive.

FIG. 5 is a cross-sectional view of still another embodiment in which the front window is a fiber optic plate.

DETAILED DESCRIPTION OF THE PREFERRED EMBODIMENTS

A front view of the disclosed colloidal display 10 is shown in FIG. 1. Conductive transparent electrodes 12, shown in phantom, are deposited on the inner surface of a diffusely transparent front window 14. The front window 14 may be glass or suitably transparent plastic. The details of the colloidal display are better shown on FIG. 2 which is a cross-section view of the colloidal display shown in FIG. 1, taken in the direction of arrows 2—2. Referring to FIG. 2, the front window 14 has a planar front surface 16 and a diffusely transmissive inner surface 18. As used herein, the term diffusely transmissive embodies any form, coating, treatment or mechanical operation which degrades the imaging capabilities of incident light passing therethrough and the back scattering of the incident light is small compared to the transmitted light. Such a diffusely transmissive surface may, for example, be produced by finely grinding or etching with hydroflouric acid one surface of the window. Alternatively, a thin layer of a hardenable resin containing very fine beads or powdered glass or a thin layer of opal glass may be applied to the inner surface. Comparable techniques for forming diffusely transmissive surface on plastics are equally known and are applicable.

The electrodes 12 may be transparent NESA or NESATRON coatings applied directly over the diffusely transparent surface 18 in the form of the desired pattern as shown. When the diffusely transparent surface is sufficiently discontinuous, as when produced by surface grinding, to adversely affect the electrical continuity of the NESA or NESATRON coatings, the surface may be buffered by an overcoating 20 as shown in FIG. 3. For example, when the front window 14 is a soda lime glass over coating 20 may be a thin layer of lead glass having a high index of refraction. The thin layer of lead glass glazed on the surface 18 provides a continuous surface on which conductive NESA coating may be applied. Returning now to FIG. 2, a thin layer 22 of transparent non-conducting material, such as an evaporated layer of silicon monoxide is deposited over the electrodes 12.

Disposed a short distance behind the front window 14 is a rear substrate 24 having a conductive specularly reflective surface 28 such as a vacuum deposited metal film deposited on its inner surface. The reflective surface 28 is also overlayed with a thin layer 30 of transparent non-conductive material such as silicon monoxide. A thin peripheral gasket 32 is disposed between the front window 14 and the rear substrate 24 enclosing the space therebetween and supporting the two windows in a parallel relationship. The space between the front window and rear substrate is filled with a colloidal suspension of dichroic dipole particles 34. The thin layers of transparent material 22 and 30 are provided to protect the electrodes 12 and the reflective surface 28 from the corrosive action of the colloidal suspension 34.

In the alternative, the rear substrate 24 and the reflective surface 28 may be replaced by a metallic substrate 36 having its inner surface 38 polished to a mirror finish as shown in FIG. 3. One skilled in the art will recognize that either or both of the alternate configurations of FIG. 3 may be incorporated in the embodiment of FIG. 2 or be used in the embodiments shown on FIGS. 4 and 5 to be discussed hereinafter.

The spacing between the front window 14 and the rear substrate 24 as well as the thickness of the electrodes 12, reflective surface 28 and the non-conductive coatings 20, 22 and 30 are exaggerated for illustration purposes. An AC electrical power supply 8, provides an electrical potential between the electrodes 12 and the reflective surface 28. Although only one lead is shown to the set of electrodes deposited on the window 14, those skilled in the art will appreciate that a separate lead is connected to each individual electrode. Moreover, means for connecting the separate leads to the individual internal electrodes are not material to the invention and are sufficiently well known in the art. The connection to the individual electrodes have are understood but have been omitted to simplify the drawings.

The operation of the colloidal display is as follows. Light incident on the front window 14 is diffusely transmitted to the colloidal suspension 34 through the diffusely transmissive surface 18. In the inactivated state, the colloidal suspension 34 absorbs the diffusely transmitted light and the display observed through the front window assumes the color of the underlying colloidal suspension. Applying an electrical potential between any selected electrodes 12 and the conductive reflective surface 28 causes the suspended dipole particles in the regions of the applied electric field underlying the activated electrodes to become aligned with the field and the colloidal suspension in these regions become transparent. The light diffusely transmitted by the front window passes through the transparent regions of the colloidal suspension and is specularly reflected by the reflective surface 28 back to the window 14. Because the light transmitted by the transparent portion of the colloidal suspension is specularly reflected, the polarization of the reflected light is unaltered and the losses due to the reflection and re-transmission through the colloidal suspension are minimized. The reflected light is diffusely transmitted back through the diffusely transmissive window to the observer in the form of an image corresponding to the configuration of the activated electrodes. The diffuse transmission of the incident and reflected light eliminates the problems previously discussed with respect to colloidal displays having only a specularly reflective surface on the rear substrate and is significantly brighter than the colloidal displays having a diffusely reflecting surface disposed behind the colloidal suspension.

Referring now to FIG. 4, there is shown an alternate embodiment of the invention. The configuration of the colloidal display is basically the same as that shown on FIG. 2 with the exception of front window 14. Instead of having a diffusely transmissive surface formed on the inner surface as shown on FIG. 2, the orientation of the window 14 is reversed and the diffusely transmissive surface 18 is formed on the external surface. The inner surface 16 is now a smooth continuous surface eliminating the problems encountered with the deposition of the electrodes 12 previously discussed with reference to the configuration of FIG. 2. In addition, images of the surroundings specularly reflected from the front surface of the window 14 are effectively eliminated enhancing the display image.

The operation of the embodiment of FIG. 4 is the same as that discussed with regards to the embodiment of FIG. 2.

A third embodiment colloidal display according to the invention is illustrated in FIG. 5. Referring to FIG.

5, the structure of the colloidal display is basically the same as shown on FIGS. 2 and 4 with the exception of the front window 14. In this embodiment, the front window 40 is a thin fiber optic plate having a plurality of small light transmissive fibers disposed normal to the front and rear surfaces fused into an integral assembly. The diameters of the individual fibers in the fiber optic plate are selected to be small with respect to the dimension of the character forming elements defined by the electrodes 12 so that they will not degrade the formed image. The fiber optic plate 40 performs the same function as the diffusely transmissive surface 18 of the front window 14. The internal reflections within each fiber of the fiber optic plate 40 causes the incident light to be diffusely transmitted to the colloidal suspension, as well as diffusely transmitting the light reflected from the reflective surface 28. Anti reflection coating may be applied to the front and rear surfaces of the fiber optic plate 40 as is known in the art to enhance the transmission therethrough. Again, the operation of the colloidal display is the same as discussed with reference to FIG. 2.

It is not intended that the invention be limited to the specific embodiments shown since it is well within the knowledge of those skilled in the art to devise other types of diffusely transmissive front windows which will equally perform the functions of the disclosed diffusely transmissive surfaces or fiber optic plate.

What is claimed is:

1. A colloidal display having enhanced brightness comprising:
   a diffusely transmissive window having a front and rear surface, said diffusely transmissive window having a set of electrically conductive transparent electrodes disposed along said rear surface in a predetermined pattern;
   a rear substrate having a specularly reflective front surface and a rear surface;
   a thin peripheral spacer disposed between the rear surface of said window and the front surface of said rear substrate forming an enclosed chamber between said window and rear substrate;
   a colloidal suspension of dichroic dipole particles disposed in said chamber and filling the space between said window and rear substrate; and
   means for applying an electrical potential between the individual electrodes of said set of transparent electrodes and the specularly reflective surface of said rear substrate.

2. The colloidal display of claim 1 wherein said colloidal suspension in a random oriented state absorbs incident illumination; said colloidal suspension further becoming transparent in the immediate regions of said transparent electrical conductive electrodes upon the application of an electric potential between said electrodes and said reflective surface.

3. The colloidal display of claim 1 wherein said rear substrate is a metal substrate and said specularly reflective front surface is a polished surface of said metal substrate.

4. The colloidal display of claim 1 wherein said rear substrate is non-metallic, and said specularly reflective surface is a thin metallic layer disposed on the front surface of said non-metallic substrate.

5. The colloidal display of claims 3 or 4 wherein said diffusely transmissive window is a transparent window having at least one roughened surface diffusely transmitting incident light.

6. The colloidal display of claim 5 wherein said roughened surface is said front surface.

7. The colloidal display of claim 5 wherein said roughened surface is said rear surface.

8. The colloidal display of claims 3 or 4 wherein said diffusely transmissive window is a fiber optic plate.

* * * * *